United States Patent
Germain et al.

(10) Patent No.: US 7,026,895 B2
(45) Date of Patent: Apr. 11, 2006

(54) GFCI RECEPTACLE HAVING PLUG BLOCKING MEANS

(75) Inventors: Frantz Germain, Rosedale, NY (US); Stephen Stewart, Berrien Springs, MI (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 10/752,576

(22) Filed: Jan. 8, 2004

(65) Prior Publication Data

US 2005/0024170 A1    Feb. 3, 2005

Related U.S. Application Data

(60) Provisional application No. 60/441,956, filed on Jan. 23, 2003.

(51) Int. Cl.
*H01H 73/00* (2006.01)
(52) U.S. Cl. .......................... 335/18; 361/42
(58) Field of Classification Search ................ 335/6, 335/18; 361/42–51
See application file for complete search history.

(56) References Cited

U.S. PATENT DOCUMENTS

| | | | |
|---|---|---|---|
| 6,437,953 B1 * | 8/2002 | DiSalvo et al. | 361/42 |
| 6,670,870 B1 | 12/2003 | Macbeth | |
| 6,670,872 B1 | 12/2003 | Kurzmann | |
| 6,734,769 B1 * | 5/2004 | Germain et al. | 335/6 |
| 2004/0125519 A1 * | 7/2004 | Germain et al. | 361/42 |

* cited by examiner

Primary Examiner—Lincoln Donovan
(74) Attorney, Agent, or Firm—Paul J. Sutton

(57) ABSTRACT

A shaped member having at least one window is located within a GFCI protected receptacle and is operated by movement of the contact arm of the GFCI to assume a first position to block at least one plug receiving opening in the receptacle and a second position which locates the window to allow the prong of a plug to freely enter the face of the receptacle. In operation, when the circuit interrupting device goes into a tripped state, the contact arm moves down to open the circuit. The downward movement of the contact arm, acting through a connecting linkage causes the shaped member to move to the first position, that of blocking at least one opening in the face of the receptacle. Resetting the circuit interrupting device by pressing in and then releasing the reset button of the GFCI causes the main contacts in the circuit interrupting device to close by the upward movement of the contact arm. As the contact arm moves up, it moves the connecting linkage to position the window of the shaped member to allow the prongs of a plug to freely enter the openings in the face of the receptacle. GFCI's normally have two separate sets of internally located contacts known as bridge contacts, one set for connecting a load to the source of electricity and a second set for connecting a user accessible load to the source of electricity. In the GFCI here disclosed the bridge contacts have been eliminated, thus reducing the cost of manufacture by coupling the conductors for both the load and the user accessible load to a single set of contacts.

20 Claims, 7 Drawing Sheets

GFCI RECEPTACLE HAVING PLUG BLOCKING MEANS

CROSS-REFERENCE TO RELATED APPLICATIONS

This application claims priority pursuant to 35 U.S.C 119(e) from U.S. Provisional Patent Application having application No. 60/441,956, filed Jan. 23, 2003.

BACKGROUND OF THE INVENTION

1. Field of the Invention

The present invention relates generally to resettable circuit interrupting devices and systems and more particularly to a new improved ground fault circuit interrupter (GFCI) protected receptacle having means to selectively prevent a plug from being inserted therein.

2. Description of the Related Art

Many electrical wiring devices have a line side which is connectable to an electrical power supply, a load side which is connectable to one or more loads and at least one conductive path between the line and load sides. Electrical connections to wires supplying electrical power or to wires conducting electricity to one or more loads can be at the line side and load side connections of a wiring device. The electrical wiring device industry has witnessed an increasing call for circuit breaking devices or systems which are designed to interrupt power to a load, such as household appliances, consumer electrical products, branch circuits, etc. In particular, electrical codes require electrical circuits in home bathrooms, in kitchens and outdoor convenience outlets to be equipped with ground fault circuit interrupters (GFCI). Presently available GFCI devices, such as the device described in commonly owned U.S. Pat. No. 4,595,894 ('894), use an electrically activated trip mechanism to mechanically break an electrical connection between the line side and the load side. Such devices are resettable by depressing a reset button after they have been tripped by, for example, detection of a ground fault. In the device disclosed in the '894 patent, the trip mechanism used to cause the mechanical breaking of the circuit, i.e., the conductive path between the line and load sides, includes a solenoid or trip coil. A test button located in the face of the GFCI is used to test the trip mechanism and circuitry is provided to sense faults. A reset button located in the face of the GFCI is provided to reset the electrical connection between the line and load sides.

However, instances may arise where an abnormal condition such as a lightning strike may result not only in a surge of electricity which causes the device to trip, but can also cause the trip mechanism in the GFCI used to break the circuit to become non-operational. This condition can occur without the knowledge of the user. Under such circumstances an unknowing user, faced with a GFCI which has tripped, may press the reset button which, in turn, will cause the device with an inoperative trip mechanism to be reset without the ground fault protection being available.

Further, an open neutral condition, which is defined in Underwriters Laboratories (UL) Standard PAG 943A, may exist with the electrical wires supplying electrical power to such GFCI devices. If an open neutral condition exists with the neutral wire on the line (versus load) side of the GFCI device, an instance may arise where a current path is created from the phase (or hot) wire supplying power to the GFCI device through the load side of the device and a person to ground. In the event that an open neutral condition exists, a GFCI device which has tripped, may be reset even though the open neutral condition may remain.

Commonly owned U.S. Pat. No. 6,040,967, which is incorporated herein in its entirety by reference, describes a family of resettable circuit interrupting devices capable of locking out the reset portion of the device if the circuit interrupting portion is non-operational or if an open neutral condition exists. Circuit interrupting devices normally have a user accessible load side connection such as a GFCI protected receptacle in addition to line and load side connections such as binding screws. The user accessible load side connected receptacle can be used to connect an appliance such as a toaster or the like to electrical power supplied from the line side. The load side connection and the receptacle are typically electrically connected together. As noted, such devices are connected to external wiring so that line wires are connected to the line side connection and load side wires are connected to the load side connection. However, instances may occur where the circuit interrupting device is improperly connected to the external wires so that the load wires are connected to the line side connection and the line wires are connected to the load connection. The inadvertent switching of conductors between the line and load terminals, which is known as reverse wiring, leaves the plug engaging receptacle contacts in the face of a GFCI unprotected. Such miswiring is prevalent in new construction where power is not yet provided to the branch circuits and the electrician/installer has difficulty in distinguishing between the line side conductors and the load side conductors. In the event the circuit interrupting device is reverse wired, the user accessible load connection may not be protected, even if fault protection to the load side connection remains.

A resettable circuit interrupting device, such as a GFCI device, that includes reverse wiring protection, and optionally an independent trip portion and/or a reset lockout portion disclosed in U.S. Pat. No. 6,246,558, ('558) assigned to the same assignee and incorporated herein by reference in its entirety provides a solution to the problem of reverse wiring. In '558, the reverse wiring protection operates at both the line and load sides of the device to provide fault protection if the line side wiring to the device is improperly connected to the load side. The trip portion operates independently of the circuit interrupting portion used to break the electrical continuity in one or more conductive paths in the device. The reset lockout portion prevents the reestablishing of electrical continuity of an open conductive path if the circuit interrupting portion is not operational or if an open neutral condition exists. While the breaking of the electrical circuit disclosed in '558 provides protection, a blocking means which prevents a user from inserting a plug into the receptacle of a GFCI in a fault state is desired as it will provide added safety.

SUMMARY OF THE INVENTION

In one embodiment, the circuit interrupting device includes a phase and neutral conductive paths disposed at least partially within a housing between the line and load sides. The phase conductive path terminates at a first connection capable of being electrically connected to a source of electricity, a second connection capable of conducting electricity to at least one load and a third connection capable of conducting electricity to at least one user accessible load through a receptacle. Similarly, the neutral conductive path, terminates at a first connection capable of being electrically connected to a source of electricity, a second connection capable of providing a neutral connection to the at least one load and a third connection capable of providing a neutral connection to the at least one user accessible load through the receptacle. The first and second connections can be screw terminals.

The circuit interrupting device also includes a circuit interrupting portion disposed within the housing and configured to cause electrical discontinuity in one or both of the phase and neutral conductive paths between the line side and the load side upon the occurrence of a predetermined condition. A reset portion activated by depressing a reset button disposed at least partially within the housing is configured to reestablish electrical continuity in the open conductive paths.

The circuit interrupting device also includes a reset lockout that prevents reestablishing electrical continuity in either the phase or neutral conductive path or both conductive paths if the circuit interrupting portion is not operating properly. Depression of the reset button causes at least a portion of the phase conductive path to contact at least one reset contact. When contact is made between the phase conductive path and the at least one reset contact, the circuit interrupting portion is activated to disable the reset lockout portion and permit electrical continuity in the phase and neutral conductive paths to be reestablished.

The circuit interrupting device also includes a trip portion that operates independently of the circuit interrupting portion. The trip portion is disposed at least partially within the housing and is configured to cause electrical discontinuity in the phase and/or neutral conductive paths independently of the operation of the circuit interrupting portion. The trip portion includes a trip actuator, such as a button marked "TEST" which is accessible from the exterior of the receptacle face and a contact arm located within the housing and which extends from the trip actuator. The trip portion is configured to facilitate a mechanical breaking of electrical continuity in the phase and/or neutral conductive paths when it is operated.

A blocking member located within the housing of the receptacle is operated by movement of the contact arm to assume a first position to block at least one prong receiving opening in the receptacle of each plug that can be received by the receptacle and a second position which allows a plug to freely enter the face of the receptacle. When the circuit interrupting device goes into a tripped state the trip arm moves down to open the circuit. The downward movement of the trip arm, acting through an interfering cantilever member, causes the blocking member to move to the first position, that of blocking at least one plug receiving opening in the face of the receptacle. Resetting the circuit interrupting device by pressing in and then releasing the reset button causes the main contacts in the circuit interrupting device to close by lifting the trip arm. As the trip arm is moved up, it moves the cantilever member which positions the blocking member to the second position which allows a plug to freely enter the openings in the face of the receptacle.

BRIEF DESCRIPTION OF THE DRAWINGS

Preferred embodiments of the present application are described herein with reference to the drawings in which similar elements are given similar reference characters, wherein.

DETAILED DESCRIPTION

Figure 1:
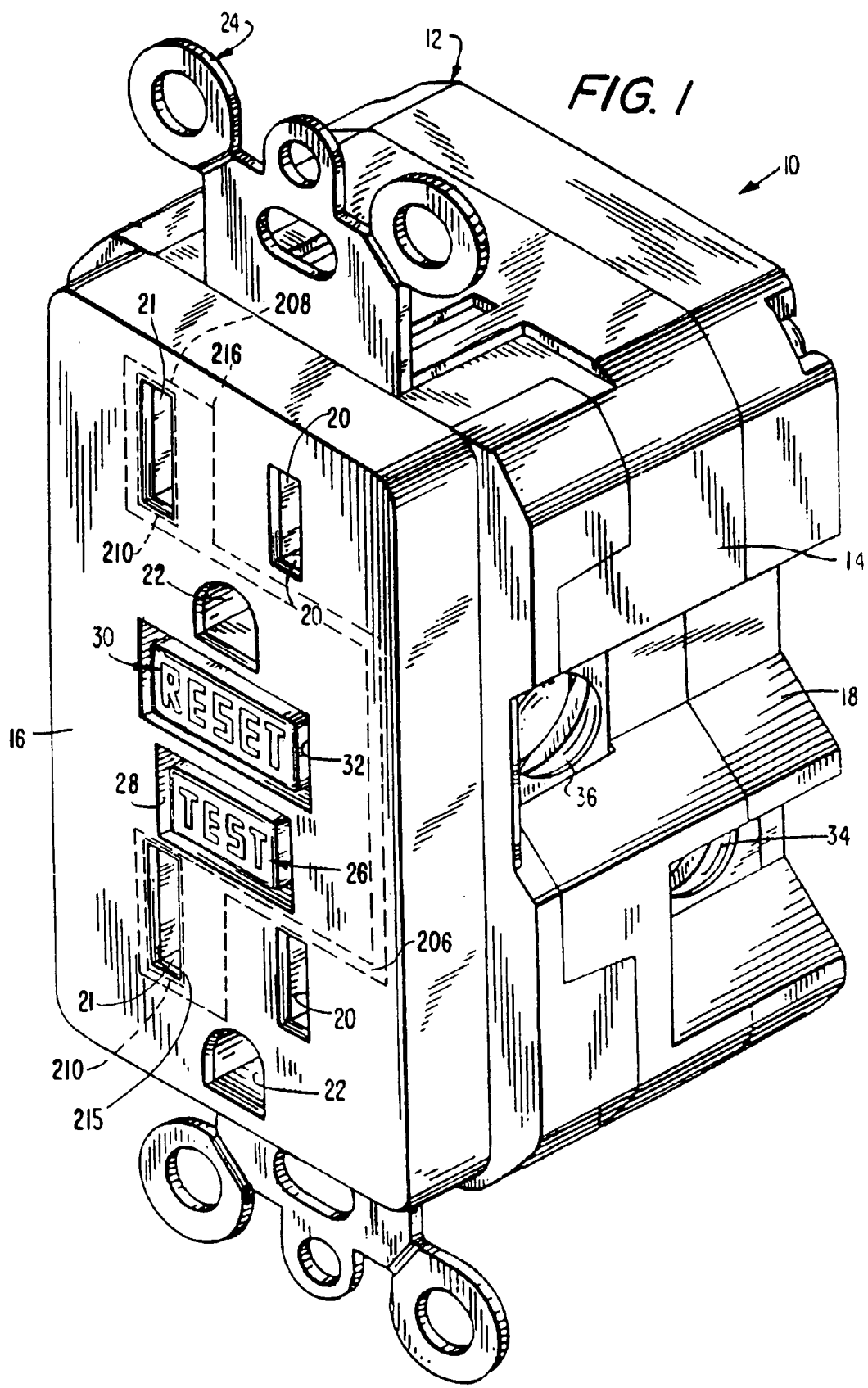
FIG. 1 is a perspective view of an embodiment of a prior art ground fault circuit interrupting (GFCI) device.

The present application contemplates various types of circuit interrupting devices that are capable of breaking at least one conductive path at both a line side and a load side of the device. The conductive path is typically divided between a line side that connects to supplied electrical power and a load side that connects to one or more loads. The term resettable circuit interrupting devices include ground fault circuit interrupters (GFCI's), arc fault circuit interrupters (AFCI's), immersion detection circuit interrupters (IDCI's), appliances leakage circuit interrupters (ALCI's), and equipment leakage circuit interrupters (ELCI's) which have a receptacle for receiving a plug.

For the purpose of the present application, the structure or mechanisms used in the circuit interrupting devices, shown in the drawings and described below, are incorporated into a GFCI protected receptacle (GFCI receptacle) which can receive at least one plug and is suitable for installation in a single gang junction box used in, for example, a residential electrical wiring system. However, the mechanisms according to the present application can be included in any of the various resettable circuit interrupting devices.

The GFCI receptacle described herein has line and load phase (or power) connectors, line and load neutral connectors and a plug receiving receptacle to provide user accessible load phase and neutral connections. These connectors may be, for example, electrical fastening devices that secure or connect external conductors to the circuit interrupting device, as well as conduct electricity. Examples of such connectors can include binding screws, lugs, terminals and external plug connections.

In one embodiment, the GFCI receptacle has a circuit interrupting portion, a reset portion, a reset lockout and a blocking member to prevent the prongs of a plug from entering the receptacle when the GFCI is in a fault state. The circuit interrupting and reset portions described herein use electromechanical components to break (open) and make (close) one or more conductive paths between the line and load sides of the device. However, electrical components such as solid state switches and supporting circuitry, may be used to open and close the conductive paths.

Generally, the circuit interrupting portion is used to automatically break electrical continuity in one or more conductive paths (i.e. open the conductive path) between the line and load sides upon the detection of a fault, which in the embodiments described is a ground fault. The reset button is used to close the open conductive paths. The blocking member, which can be positioned to prevent the prongs of a plug from entering the openings in the receptacle when a fault is detected, is activated by a connecting arm connected to at least one of the movable contact arms acting through a lifting member between the line side and the load side. The reset is used to disable the reset lockout, close the open conductive paths and reset the blocking member to its second or open position to permit a plug to be inserted into the receptacle if the circuit is operational. The reset and reset lockout portions operate in conjunction with the operation of the circuit interrupting portion, so that electrical continuity cannot be reestablished and the blocking member continues to block at least one opening of the receptacle to prevent the prongs of a plug from entering the receptacle if the circuit interrupting portion is not operational, if an open neutral condition exists and/or if the device is reverse wired.

The above described structure of a blocking member to selectively block at least one opening of the receptacle can be incorporated in any resettable circuit interrupting device, but for simplicity the description herein is directed to GFCI receptacles.

Figure 2:
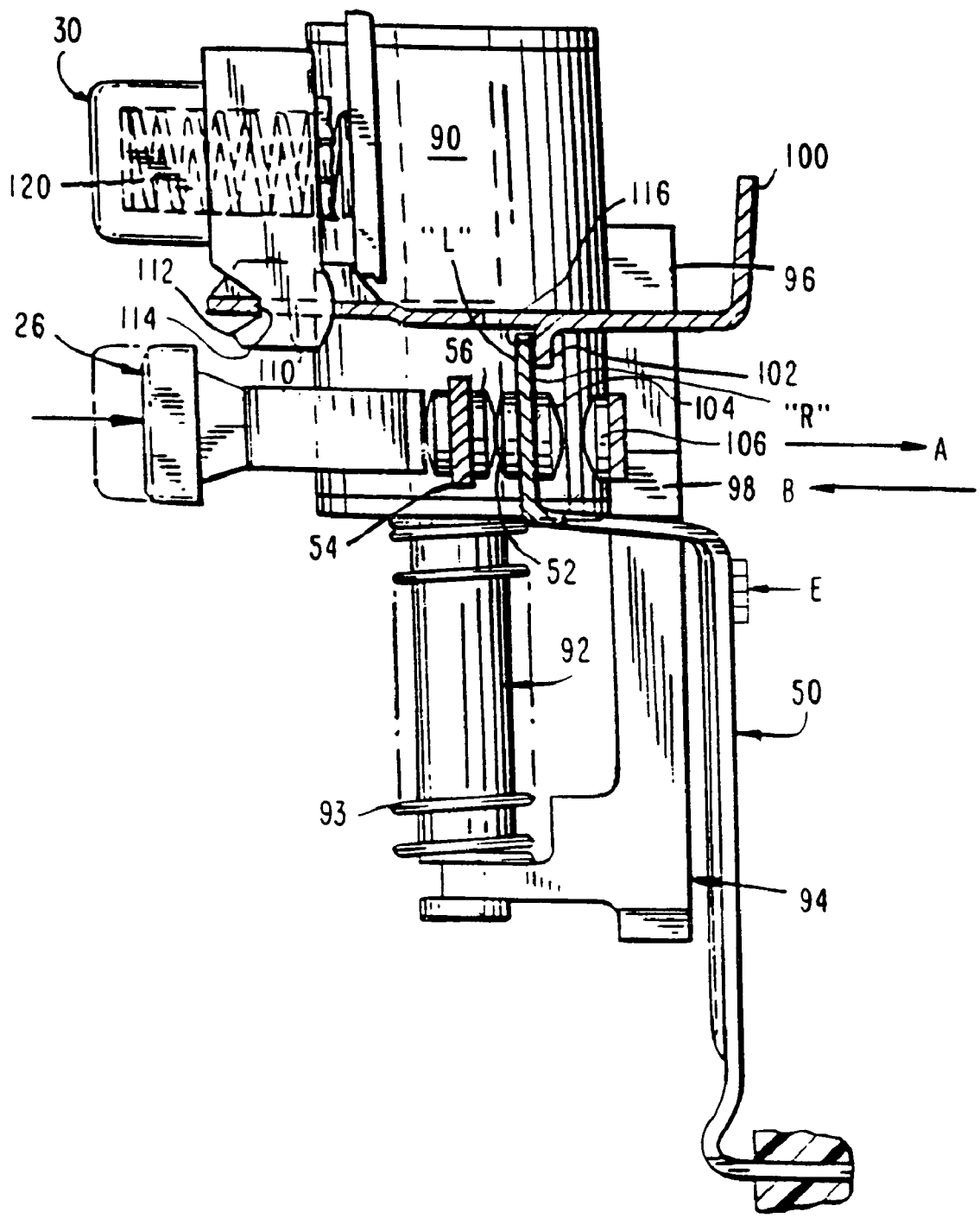
FIG. 2 is a side elevation view, partially in section, of a portion of the GFCI device shown in FIG. 1, illustrating the GFCI device in a set or circuit making position.
Figure 3:
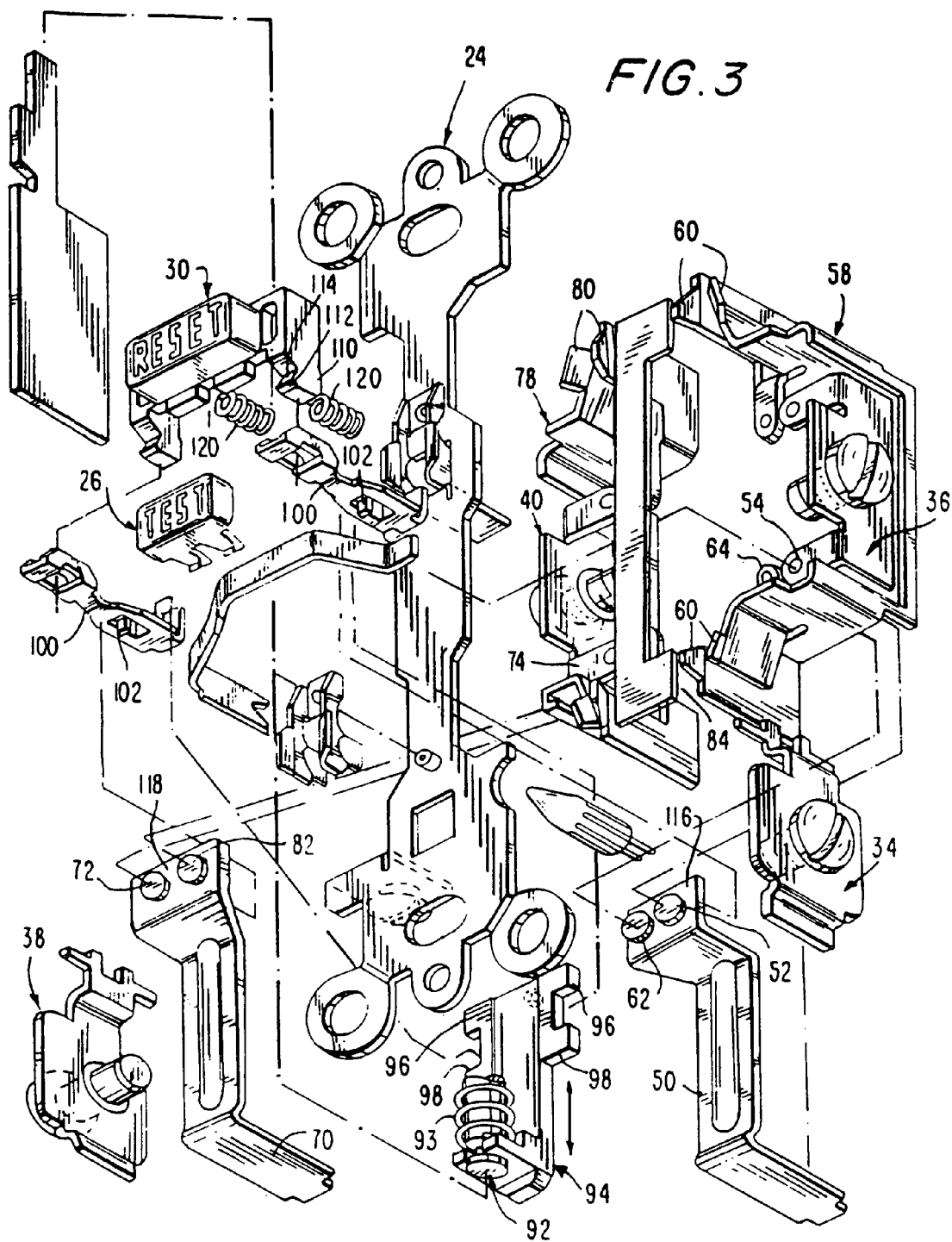
FIG. 3 is an exploded view of internal components of the prior art circuit interrupting device of FIG. 1.
Figure 4:
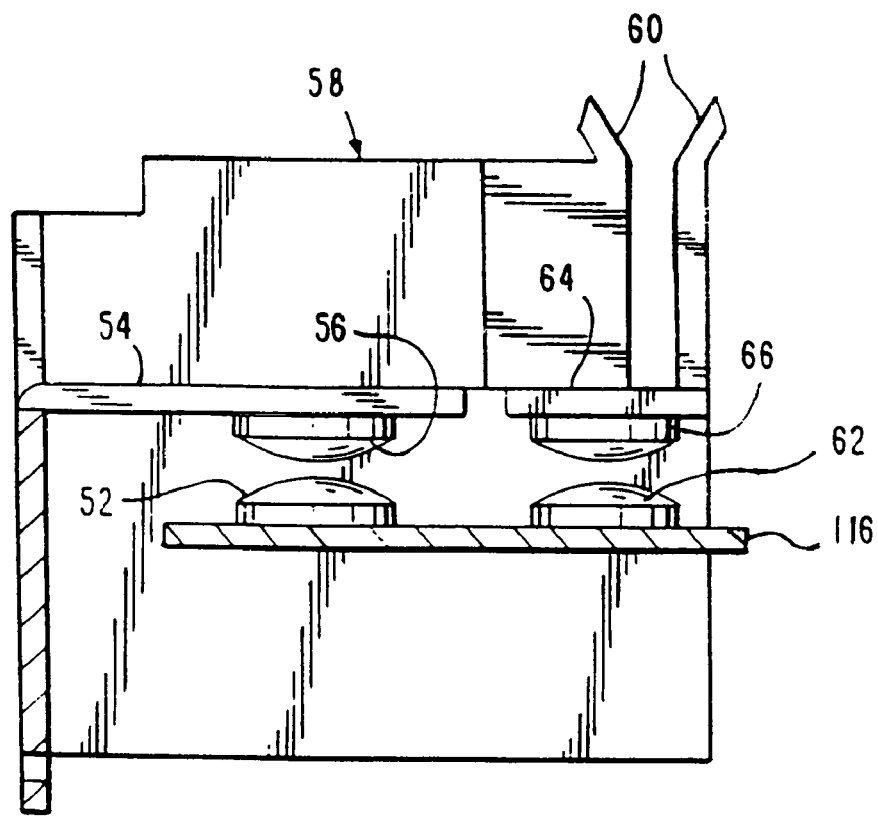
FIG. 4 is a partial sectional view of a portion of a conductive path shown in FIG. 3.

FIGS. 1, 2 and 3 are of a ground fault circuit interrupting device such as is disclosed in commonly owned U.S. Pat. No. 6,246,558 which is incorporated herein by reference in its entirety and portions of which are here included to provide a full and complete understanding of the invention here disclosed. Turning to FIG. 1, the GFCI receptacle 10 has a housing 12 consisting of a relatively central body 14 to which a face or cover portion 16 and a rear portion 18 are removably secured. The face portion 16 has entry ports 20 and 21 for receiving normal or polarized prongs of a male plug of the type normally found at the end of a lamp or appliance cord set, as well as ground prong receiving openings 22 to accommodate a three wire plug. The receptacle also includes a mounting strap 24 used to fasten the receptacle to a junction box.

A test button 26 which extends through opening 28 in the face portion 16 of the housing 12 is used to activate a test operation, that tests the operation of the circuit interrupting portion (or circuit interrupter) disposed in the device. The circuit interrupting portion, to be described in more detail below, is used to break electrical continuity in one or more conductive paths between the line and load side of the device. A reset button 30 forming a part of the reset portion extends through opening 32 in the face portion 16 of the housing 12. The reset button is used to activate a reset operation, which reestablishes electrical continuity to open conductive paths. Electrical connections to existing household electrical wiring are made via binding screws 34 and 36, where screw 34 is an input or line phase connection, and screw 36 is an output or load phase connection. Two additional binding screws 38 and 40 (see FIG. 2) are located on the opposite side of the receptacle 10. These additional binding screws provide line and load neutral connections, respectively. A more detailed description of a GFCI receptacle is provided in U.S. Pat. No. 4,595,894, which is incorporated herein in its entirety by reference. Binding screws 34, 36, 38 and 40 are exemplary of the types of wiring terminals that can be used to provide the electrical connections. Examples of other types of wiring terminals include set screws, pressure clamps, pressure plates, push-ion type connections, pigtails and quick connect tabs.

The conductive path between the line phase connector 34 and the load phase connector 36 includes contacts on contact arm 50 which is movable between a stressed and an unstressed position, movable contact 52 mounted to the movable contact arm 50, fixed contact arm 54 secured to or monolithically formed into the load phase connection 36 and fixed contact 56 mounted to the fixed contact arm 54. The user accessible load phase connection for this embodiment includes terminal assembly 58 having two binding terminals 60 which are capable of engaging a prong of a male plug inserted there between. The conductive path between the line phase connection 34 and the user accessible load phase connection includes, contact arm 50, movable contact 62 mounted to contact arm 50, fixed contact arm 64 secured to or monolithically formed into terminal assembly 58, and fixed contact 66 mounted to fixed contact arm 64. These conductive paths are collectively called the phase conductive path.

Similar to the above, the conductive path between the line neutral connector 38 and the load neutral connector 40 includes, contacts on contact arm 70 which is movable between a stressed and an unstressed position, movable contact 72 mounted to movable contact arm 70, fixed contact arm 74 secured to or monolithically formed into load neutral connection 40, and fixed contact 76 mounted to the fixed contact arm 74. The user accessible load neutral connection for this embodiment includes terminal assembly 78 having two binding terminals 80 which are capable of engaging a prong of a male plug inserted there between. The conductive path between the line neutral connector 38 and the user accessible load neutral connector includes, contact arm 70, contact arm 84 secured to or monolithically formed into terminal assembly 78, and fixed contact 86 mounted to contact arm 84. These conductive paths are collectively called the neutral conductive path.

Referring to FIG. 2, the circuit interrupting portion has a circuit interrupter and electronic circuitry capable of sensing faults, e.g., current imbalances, on the hot and/or neutral conductors. In an embodiment for the GFCI receptacle, the circuit interrupter includes a coil assembly 90, a plunger 92 responsive to the energizing and de-energizing of the coil assembly and a banger 94 connected to the plunger 92. The banger 94 has a pair of banger dogs 96 and 98 which interact with movable latching members 100 used to set and reset electrical continuity in one or more conductive paths. The coil assembly 90 is activated in response to the sensing of a ground fault by, for example, the sense circuitry shown in FIG. 5 that includes a differential transformer that senses current imbalances.

The reset portion includes reset button 30, the movable latching members 100 connected to the reset button 30, latching fingers 102 and normally open momentary reset contacts 104 and 106 that temporarily activate the circuit interrupting portion when the reset button is depressed, when in the tripped position. The latching fingers 102 are used to engage side R of each contact arm 50, 70 and move the arms 50, 70 back to the stressed position where contacts 52, 62 touch contacts 56, 66 respectively, and where contacts 72, 82 touch contacts 76, 86 respectively.

The movable latching members 102 can be common to each portion (i.e., the circuit interrupting, reset and reset lockout portions) and used to facilitate making, breaking or locking out of electrical continuity of one or more of the conductive paths. However, the circuit interrupting devices according to the present application also contemplate embodiments where there is no common mechanism or member between each portion of between certain portions. Further, the present application also contemplates using circuit interrupting devices that have circuit interrupting, reset and reset lockout portions to facilitate making, breaking or locking out of the electrical continuity of one or both of the phase or neutral conductive paths.

In the embodiment shown in FIGS. 2 and 3, the reset lockout portion includes latching fingers 102 which after the device is tripped, engages side L of the movable arms 50, 70 so as to block the movable arms 50, 70 from moving. By blocking movement of the movable arms 50, 70, contacts 52 and 56; contacts 62 and 66; contacts 72 and 76; and contacts 82 and 86 are prevented from touching. Alternatively, only one of the movable arms 50 or 70 may be blocked so that their respective contacts are prevented from touching. Further, in this embodiment, latching fingers 102 act as an active inhibitor to prevent the contacts from touching. Alternatively, the natural bias of movable arms 50 and 70 can be used as a passive inhibitor that prevents the contacts from touching.

Referring to FIG. 2, the GFCI receptacle is shown in a set position where movable contact arm 50 is in a stressed condition so that movable contact 52 is in electrical engagement with fixed contact 56 of contact arm 54. If the sensing circuitry of the GFCI receptacle senses a ground fault, the coil assembly 90 is energized to draw plunger 92 into the coil assembly 90 and banger 94 moves upwardly. As the banger moves upward, the banger front dog 98 strikes the latch member 100 causing it to pivot in a counterclockwise direction about the joint created by the top edge 112 and inner surface 114 of finger 110. The movement of the latch member 100 removes the latching finger 102 from engagement with side R of the remote end 116 of the movable contact arm 50, and permits the contact arm 50 to return to its pre-stressed condition opening contacts 52 and 56.

After tripping, the coil assembly 90 is de-energized, spring 93 returns plunger 92 to its original extended position and banger 94 moves to its original position releasing latch member 100. At this time, the latch member 100 is in a lockout position where latch finger 102 inhibits movable contact 52 from engaging fixed contact 56. One or both latching fingers 102 can act as an active inhibitor to prevent the contacts from touching. Alternatively, the natural bias of movable arms 50 and 70 can be used as a passive inhibitor that prevents the contacts from touching.

To reset the GFCI receptacle so that contacts 52 and 56 are closed and continuity in the phase conductive path is re-established, the reset button 30 is depressed sufficiently to overcome the bias force of return spring 120 (FIG. 3) and moves the latch member 100 in the direction of arrow A. Depressing the reset button 30 causes the latch finger 102 to contact side L of the movable contact arm 50 and, continued depression of the reset button 30, forces the latch member to overcome the stress force exerted by the arm 50 to cause the reset contact 104 on the arm 50 to close on reset contact 106. Closing the reset contacts activates the operation of the circuit interrupter by, for example simulating a fault, so that plunger 92 moves the banger 94 upwardly striking the latch member 100 which pivots the latch finger 102, while the latch member 100 continues to move in the direction of arrow A. As a result, the latch finger 102 is lifted over side L of the remote end 116 of the movable contact arm 50 onto side R of the remote end of the movable contact arm. Contact arm 50 now returns to its unstressed position, opening contacts 104 and 106; to terminate the activation of the circuit interrupting portion, thereby de-energizing the coil assembly 90.

After the circuit interrupter operation is activated, the coil assembly 90 is de-energized, plunger 92 returns to its original extended position, banger 94 releases the latch member 100 and latch finger 102 is in a reset position. Release of the reset button causes the latching member 100 and movable contact arm 50 to move in the direction of arrow B until contact 52 electrically engages contact 56, as seen in FIG. 2.

Figure 7:
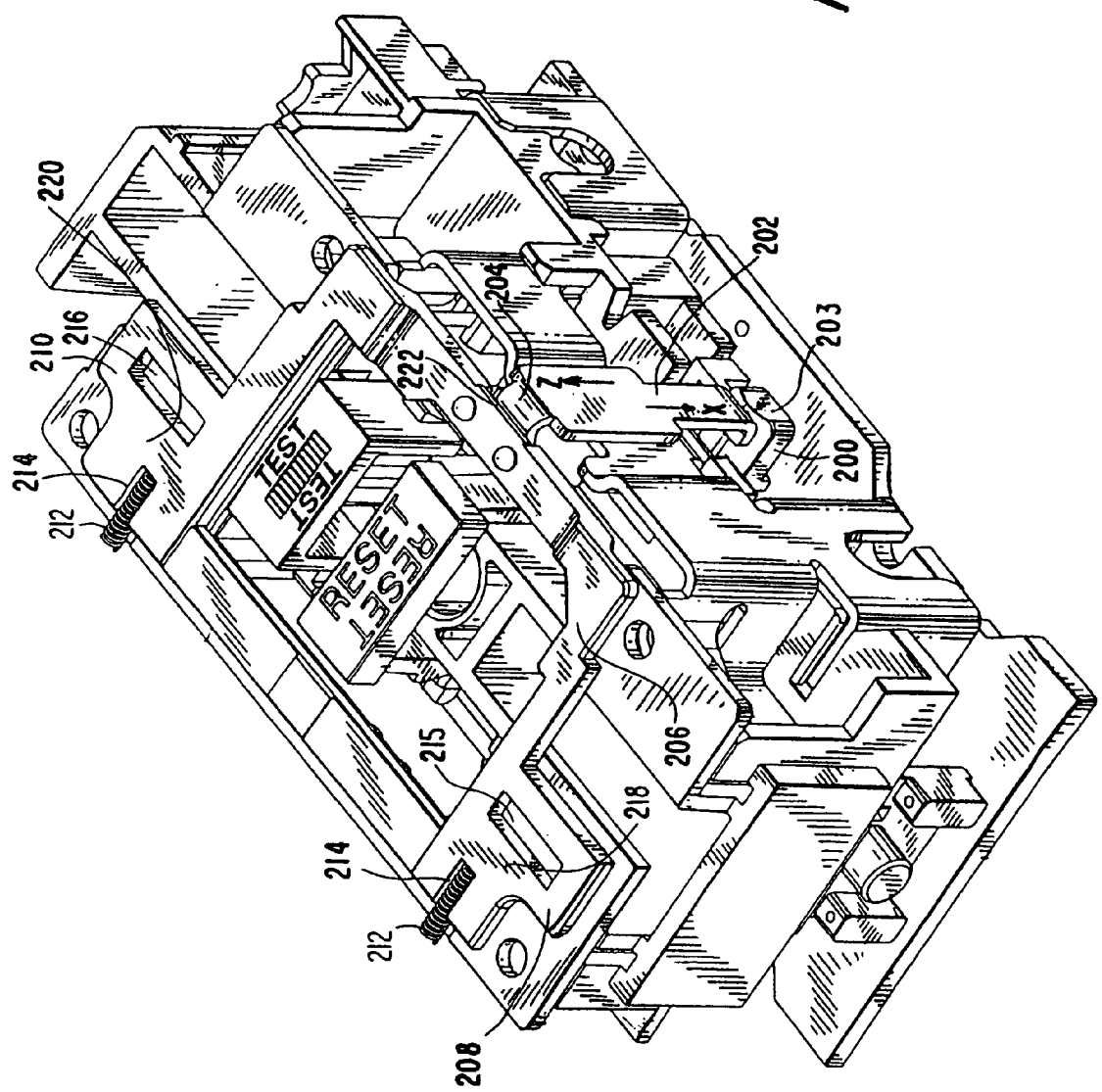

Referring to FIG. 7, there is shown a GFCI having a blocking member which is selectively operated to block plug receiving openings in the face of the receptacle when the GFCI is in its tripped state. A lifting member 200 made of insulating material is rigidly connected at one end by rivets of the like to movable contact arm 50 (see FIG. 2) at a convenient location such as location E and at its other end to a connecting arm 202. The top of connecting arm supports a projection 204 bent to provide a downward sloping surface which slidably engages a U shaped member 206 having two blocking shutters 208, 210. The U shaped member is located within the housing of the receptacle between the face portion 16 and the central body 14, and is free to slide back and forth to allow openings in the shutters to be in or out of alignment with at least one of the openings 20, 21. Springs 212 located within receiving openings 214 urge the U shaped member to be in engagement with the downward sloping surface of projection 204. Each blocking member 208, 210 has a window 215, 216 and an obstruction 218, 220 where the obstructions are located to block at least one of the prong receiving openings 20, 21, of each plug when the connecting arm is in its down position X; and the windows are located to be in alignment with and permit the prongs of a plug to be inserted into the receptacles when the connecting arm is in its up position 2.

Referring to FIG. 1, the U shaped blocking member 206 (shown in dotted outline in the plug blocking position), is made of insulating material and is located within the body of the receptacle immediately behind the face portion of housing 12, and the blocking members 208, 210 are positioned to assume a first position to block at least one opening, such as openings 21 in the receptacle or a second position which locates the windows 215, 216 to be in alignment with the openings 21 in the receptacle. The U shaped member is located between the plug receiving openings in the face portion of the receptacle and top end of the electrical contacts associated with that opening. Returning to FIG. 7, the end 204 of connecting arm 202 has a ramp section which slidably engages a centrally located edge 222 of U shaped member 206. Connecting arm 202, being connected to the contact arm 50 (see FIG. 2), is moved up when the contact arm is moved up, and is moved down when the contact arm moves down. The geometries of the ramp section of connecting arm 202 and the centrally located edge 222 of the U shaped member 206, and their positions relative to each other are such that the contact arm 50 positions the connecting arm 202 to its up position Z when the GFCI is not in a fault state; and the contact arm 50 positions the connecting arm 202 to its down position X when the GFCI is in a fault state. Thus, when the GFCI is not in a fault condition, contact arm 50 is in its up position (see FIG. 2) which positions the connecting arm to its raised position Z. When the connecting arm is in its raised or up position, the U shaped member 206 and the blocking members are moved against the force of the springs 212 to position the windows 215, 216 to be in alignment with the cooperating prong receiving openings of the receptacle, and the prongs of a plug can freely enter the receptacle openings. Similarly, when the contact arm 50 is in its down position, the connecting arm 202 is moved toward its down position X and the U shaped member 206 and blocking members 218, 220 are moved by the force of the springs 212 to position the obstructions 208, 210 to be positioned behind at least one opening of each of the receptacles to prevent the prongs of a plug from entering a receptacle.

Thus, in operation, the obstructions block at least one prong receiving opening of each receptacle when the GFCI is in the tripped state. Once a reset is attempted, if functional, as the reset button is released it lifts the contact arm 50 which closes the main contacts. As this happens, the contact arm 50 which is connected to the connecting arm 202, moves connecting arm 202 to its up position Z and the ramp section of the projection 204 engages the centrally located edge 222 to drive the U shaped member against the force of the springs 212 to position the windows 216, 218 to be in alignment with their cooperating openings in the receptacle. It is noted that connecting arm 202 may be prevented from moving up if a plug is in the receptacle when the receptacle is tripped.

Figure 5:
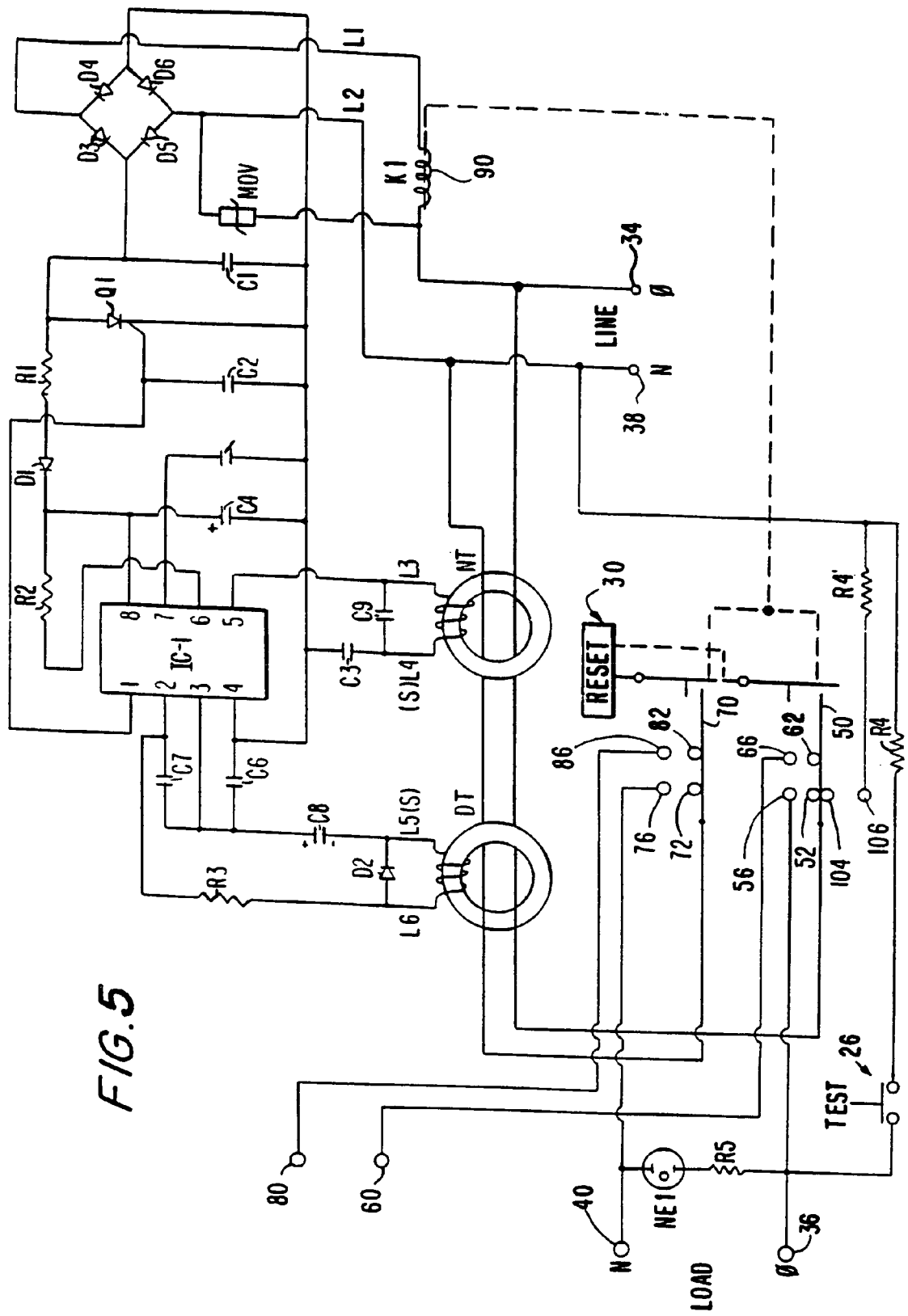
FIG. 5 is a schematic diagram of the circuit of the ground fault circuit interrupting device of FIG. 1.
Figure 6:
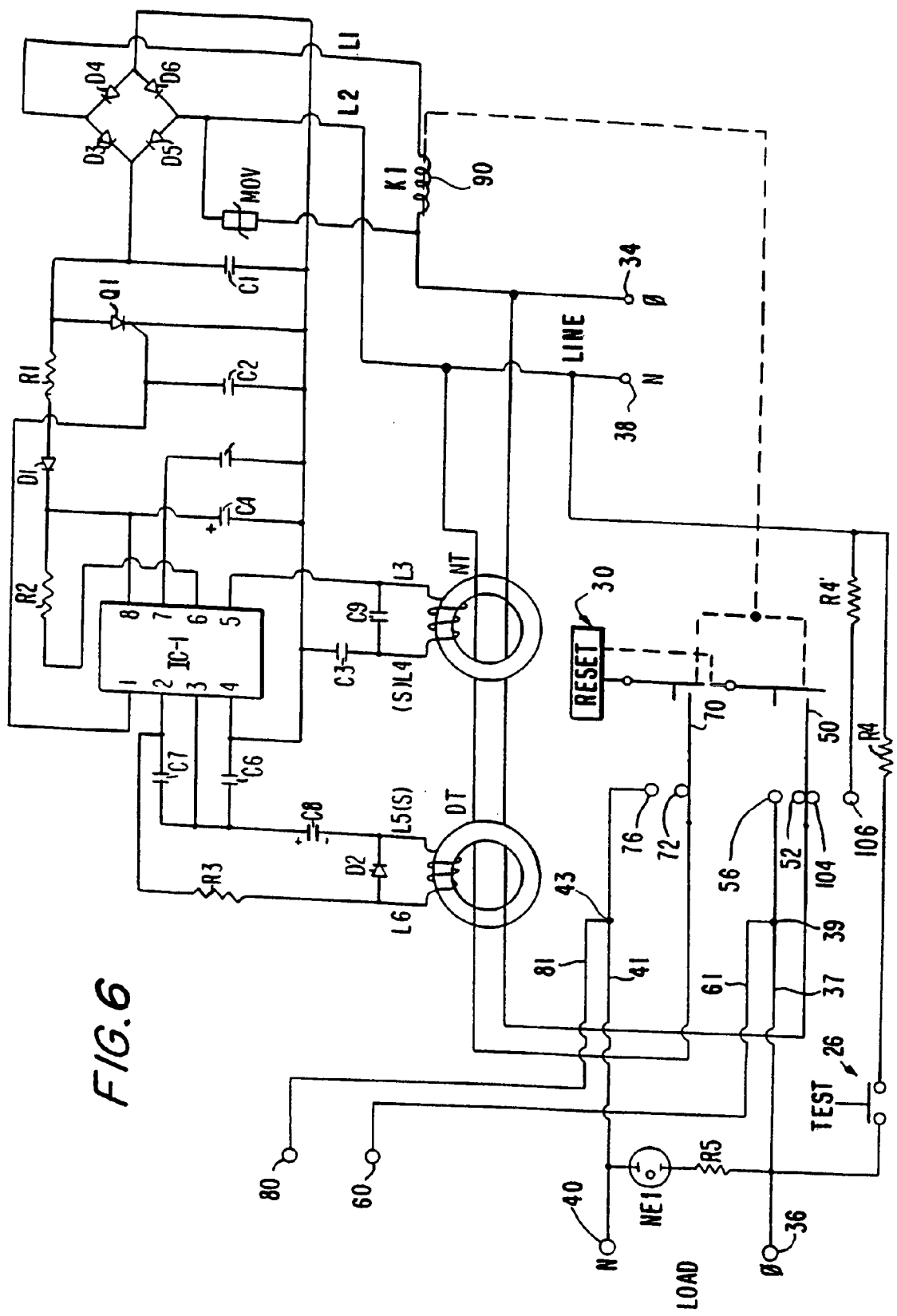
FIG. 6 is a schematic diagram of a ground fault circuit interrupting device which has no bridge contacts; and, FIG. 7 is a partial perspective view of the internal components of a ground fault circuit interrupting device showing a shaped blocking member in accordance with the principles of the invention.

Referring to the prior art schematic diagram shown in FIG. 5, the circuit of the GFCI for detecting faults utilizes bridge contacts to ensure protection for the receptacle contacts. More specifically, contact arm 50 supports two contacts 52 and 62. Contact 52 cooperates with contact 56 and contact 62 cooperates with contact 66. In operation, when the prior art GFCI is in its no fault state, contacts 52 and 56 are closed and contacts 62 and 66 are closed to allow receptacle contact 60 to be connected to the load phase contact 36. When the GFCI is in its fault state, contacts 52 and 62 are not connected to contacts 56 and 66 respectively. Contacts 52, 56 and 62, 66 are referred to as bridge contacts. They provide isolation of the line phase contact 34 from the load phase contact 36 and the receptacle contact 60. In a similar manner, bridge contacts 72, 76 and 82, 86 provided isolation of the line neutral contact 38 from the line neutral contact 40 and the receptacle contact 80. A more economical and simpler method of separating the line neutral contact 38 and line phase contact 34 from the receptacle contacts and the load contacts is disclosed in FIG. 6. Referring specifically to contact arm 50, movable contact 62 which cooperates with fixed contact 66 are not required and are eliminated and lead 61 from receptacle contact 60 is connected at point 39 to lead 37 which connects load contact 36 to contact 56. In a similar manner, movable contact 82 attached to contact arm 70 and which cooperates with fixed contact 86 are not now required and are eliminated, and lead 81 from receptacle contact 80 is connected at point 43 to lead 41 which connects contact 40 to contact 76. With the new improved circuit of FIG. 6, the contacts 60, 80 of the receptacle and the contacts 36, 40 of the load are connected together and they, in turn, are connected to the line contacts 34, 38 only when the GFCI is in a no fault state. Under normal operating conditions when there is no fault on the line, current flow is from the line contacts through the GFCI to the load contacts 36, 40 and to the receptacle contacts 60, 80.

Although the components used during circuit interrupting and device reset operations as described above are electromechanical in nature, the present application also contemplates using electrical components, such as solid state switches and supporting circuitry, as well as other types of components capable of making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed is:

1. A circuit interrupting device comprising:
    a housing;
    a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;
    a circuit interrupting portion disposed within said housing and configured to cause electrical discontinuity in said phase and neutral conductive paths between said line side and said load side upon the occurrence of a predetermined condition;
    a reset portion disposed at least partially within said housing and configured to reestablish electrical continuity in said phase and neutral conductive paths;
    said circuit interrupting portion further comprising a reset lockout portion that prevents reestablishing electrical continuity in said phase and neutral conductive paths if said circuit interrupting portion is non-operational, if an open neutral condition exists or if a reverse wiring condition exists, wherein said reset portion comprises:
    a reset button;
    at least one reset contact which when depressed is capable of contacting at least a portion of said phase conductive path to cause said predetermined condition, wherein if said circuit interrupting portion is operational, the circuit interrupting portion is activated to disable said reset lockout portion and facilitate reestablishing electrical continuity in said phase and neutral conductive paths, and wherein if said circuit interrupting portion is non-operational, said reset lockout portion remains enabled so that reestablishing electrical continuity in said phase and neutral conductive paths is prevented; and
    a shaped member located within the housing controlled by the circuit interrupting portion to block the third connection from being connected to a user accessible load when the circuit interrupting portion is non-operational, an open neutral exists or a reverse wiring condition exists.

2. The circuit interrupting device of claim 1 wherein the shaped member is adapted to assume a first position to prevent the third connection being connected to the user accessible load while the circuit interrupting portion is non-operational and a second position to allow the third connection to be connected to the user accessible load while the circuit interrupting portion is operational.

3. The circuit interrupting device of claim 2 wherein the shaped member is positioned to the first or second position by the circuit interrupting portion.

4. The circuit interrupting device of claim 3 wherein the shaped member comprises a blocking member coupled to be moved by a cantilever member which engages the circuit interrupting portion.

5. The circuit interrupting device of claim 4 wherein the shaped member is non-conducting.

6. A circuit interrupting device comprising:
    a housing;
    a first electrical conductive path disposed at least partially within said housing and terminating at a first connection, said first connection capable of being electrically connected to a source of electricity,
    a second electrical conductive path disposed at least partially within said housing and terminating at a second connection, said second connection capable of being electrically connected to at least one load when electrical continuity between said first and second electrical conductive paths is made;

a third electrical conductive path disposed at least partially within said housing and terminating at a third connection, said third connection capable of being electrically connected to at least one user accessible load when electrical continuity between said first and third electrical conductive paths is made;

a circuit interrupting portion disposed within said housing and configured to break electrical continuity between said first and second conductive paths and between said first and third conductive path upon the occurrence of a predetermined condition;

a reset portion disposed at least partially within said housing and configured to make electrical continuity between said first and second conductive paths and between said first and third conductive paths;

said circuit interrupting device further comprising a reset lockout portion that prevents the making of electrical continuity between said first and second conductive paths and between said first and third conductive paths, if said circuit interrupting portion is non-operational;

wherein said reset portion comprises:

a reset button;

at least one reset contact which when depressed is capable of contacting at least a portion of one of said first or second conductive paths to cause said predetermined condition, wherein if said circuit interrupting portion is operational, said circuit interrupting portion is activated to disable said reset lockout portion and facilitate making of electrical continuity between said first and second conductive paths and between said first and third conductive paths, and wherein if said circuit interrupting portion is non-operational, said reset lockout portion remains enabled so that making of electrical continuity between said first and second conductive paths and between said first and third conductive paths is prevented; and shaped member having at least one window coupled to the circuit interrupting portion to block the third connection from being connected to a user accessible load upon the occurrence of the predetermined condition.

7. A circuit interrupting device comprising:

a housing;

a first electrical conductive path disposed at least partially within said housing and terminating at a first connection, said first connection capable of being electrically connected to a source of electricity, a second electrical conductive path disposed at least partially within said housing and terminating at a second connection, said second connection capable of being electrically connected to at least one load when electrical continuity between said first and second electrical conductive paths is made;

a third electrical conductive path disposed at least partially within said housing and terminating at a third connection, said third connection being electrically connected to the second electrical conductive path and capable of being electrically connected to at least one user accessible load when electrical continuity between said first and second electrical conductive paths is made;

a circuit interrupting portion disposed within said housing and configured to break electrical continuity from said first to said second and third conductive paths upon the occurrence of a predetermined condition;

a reset portion disposed at least partially within said housing and configured to make electrical continuity from said first to said second and/or third conductive paths;

said circuit interrupting device further comprising a reset lockout portion that prevents the making of electrical continuity from said first to said second and third conductive paths, if said circuit interrupting portion is non-operational;

wherein said reset portion comprises:

a reset button; and at least one reset contact which when depressed is capable of contacting at least a portion of one of said first, second or third conductive paths to cause said predetermined condition, wherein if said circuit interrupting portion is operational, said circuit interrupting portion is activated to disable said reset lockout portion and facilitate making of electrical continuity from said first to said second and third conductive paths, and wherein if said circuit interrupting portion is non-operational, said reset lockout portion remains enabled so that making of electrical continuity from said first to said second and third conductive paths is prevented.

8. A circuit interrupting device comprising:

a housing;

a first electrical conductive path disposed at least partially within said housing and terminating at a first connection, said first connection capable of being electrically connected to a source of electricity, a second electrical conductive path disposed at least partially within said housing and terminating at a second connection, said second connection capable of being electrically connected to at least one load when electrical continuity between said first and second electrical conductive paths is made;

a third electrical conductive path disposed at least partially within said housing and terminating at a third connection, said third connection being electrically connected to the second electrical conductive path and capable of being electrically connected to at least one user accessible load when electrical continuity between said first and second electrical conductive paths is made;

a circuit interrupting portion disposed within said housing and configured to break electrical continuity from said first to said second and third conductive paths upon the occurrence of a predetermined condition;

a reset portion disposed at least partially within said housing and configured to make electrical continuity from said first to said second and/or third conductive paths;

said circuit interrupting device further comprising a reset lockout portion that prevents the making of electrical continuity from said first to said second and third conductive paths, if said circuit interrupting portion is non-operational;

wherein said reset portion comprises:

a reset button;

at least one reset contact which when depressed is capable of contacting at least a portion of one of said first, second or third conductive paths to cause said predetermined condition, wherein if said circuit interrupting portion is operational, said circuit interrupting portion is activated to disable said reset lockout portion and facilitate making of electrical continuity from said first to said second and third conductive paths, and wherein if said circuit interrupting portion is non-operational, said reset lockout portion remains enabled so that making of electrical continuity from said first to said second and third conductive paths is prevented; and, shaped member coupled to the circuit interrupting device to block the third connection from being connected to a user accessible load while there is a break in the electrical continuity between the first and third conductive path.

9. The circuit interrupting device of claim 8 wherein the shaped member is adapted to assume a first position to block the third connection from being connected to the user accessible load while the circuit interrupting portion is non-operational and a second position to allow the third connection to be connected to the user accessible load while the circuit interrupting portion is operational.

10. The circuit interrupting device of claim 9 wherein the shaped comprises a blocking member coupled to a cantilever member controlled by the circuit interrupting portion to position the blocking member to the first or second position.

11. The circuit interrupting device of claim 10 wherein the shaped member is non-conducting.

12. A circuit interrupting device comprising:

housing means;

first electrical conductive path means for conducting electricity within said housing means, and capable of electrically connecting to a source of electricity;

second electrical conductive path means for conducting electricity within said housing means, and capable of electrically connecting to at least one load when electrical continuity between said first and second electrical conductive path means is made;

third electrical conductive path means for conducting electricity within said housing means, and capable of electrically connecting to at least one user accessible load when electrical continuity between said first and third electrical conductive path means is made;

circuit interrupting means disposed within said housing means for breaking electrical continuity from said first to said second and third conductive path means, upon the occurrence of a predetermined condition;

reset means disposed at least partially within said housing means for reestablishing electrical continuity from said first to said second and third conductive path means;

wherein said reset means comprises:

a reset button;

reset contact means operatively associated with said reset button for activating said circuit interrupting means by causing said predetermined condition when said reset button is depressed; and shaped member coupled to the circuit interrupting means to block the third electrical conductive path means from being connected to the at least one user accessible load during the occurrence of the predetermined condition.

13. The circuit interrupting device of claim 12 wherein the shaped member is adapted to assume a first position to block the third connection from being connected to the user accessible load upon the occurrence of the predetermined condition and a second position to allow the third connection to be connected to the user accessible load upon the termination of the predetermined condition.

14. The circuit interrupting device of claim 13 wherein the shaped member comprises a blocking member coupled to a cantilever member controlled by the circuit interrupting means to position the blocking member to the first or second position.

15. The circuit interrupting device of claim 14 wherein the shaped member is non-conducting.

16. A circuit interrupting system comprising:

a source of power;

a circuit interrupting device having fault protection at both line and load sides of said device connected to said source of power;

at least one load connected to said circuit interrupting device;

wherein said circuit interrupting device comprises:

a housing;

a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;

a circuit interrupting portion disposed within said housing and configured to cause electrical discontinuity in said phase and neutral conductive paths at both said line side and said load side upon the occurrence of a predetermined condition;

a reset portion disposed at least partially within said housing and configured to reestablish electrical continuity is said phase and neutral conductive paths;

said circuit interrupting device further comprising a reset lockout portion that prevents reestablishing electrical continuity in said phase and neutral conductive paths if said circuit interrupting portion is non-operational of if an open neutral condition exists;

wherein said reset portion comprises;

a reset button;

at least one reset contact which when depressed is capable of contacting at least a portion of said phase conductive path to cause said predetermined condition wherein if said circuit interrupting portion is operational, said circuit interrupting portion is activated to disable said reset lockout portion and facilitate reestablishing electrical continuity in said phase and neutral conductive paths, and wherein if said circuit interrupting portion is non-operational, said reset lockout portion remains enabled so the reestablishing electrical continuity in said phase and neutral conductive paths is prevented; and shaped member coupled to the circuit interrupting portion to block the third connection from being connected to the at least one user accessible load while the circuit interrupting device is non-operational or if an open neutral condition exists.

17. The circuit interrupting device of claim 16 wherein the shaped member is adapted to assume a first position to prevent the third connection being connected to the user accessible load while the circuit interrupting portion is non-operational and a second position to allow the third connection to be connected to the user accessible load while the circuit interrupting portion is operational.

18. The circuit interrupting device of claim 17 wherein the shaped member is positioned to the first or second position by the circuit interrupting portion.

19. The circuit interrupting device of claim 18 wherein the shaped member comprises a blocking member coupled to be moved by a cantilever member which engages the circuit interrupting portion.

20. The circuit interrupting device of claim 19 wherein the shaped member is non-conducting.

* * * * *

UNITED STATES PATENT AND TRADEMARK OFFICE
CERTIFICATE OF CORRECTION

PATENT NO. : 7,026,895 B2  Page 1 of 1
APPLICATION NO. : 10/752576
DATED : April 11, 2006
INVENTOR(S) : Frantz Germain and Stephen Stewart It is certified that error appears in the above-identified patent and that said Letters Patent is hereby corrected as shown below:

Title Page Item [75]
Inventors: add the name of the third inventor --Edward Bazayev--

Signed and Sealed this

Sixth Day of February, 2007

JON W. DUDAS
*Director of the United States Patent and Trademark Office*